United States Patent [19]

Kitajima

[11] Patent Number: 5,229,805
[45] Date of Patent: Jul. 20, 1993

[54] CAMERA
[75] Inventor: Tatsutoshi Kitajima, Kodaira, Japan
[73] Assignee: Ricoh Company, Ltd., Tokyo, Japan
[21] Appl. No.: 882,529
[22] Filed: May 13, 1992
[30] Foreign Application Priority Data
  May 28, 1991 [JP] Japan .................................. 3-123706
[51] Int. Cl.[5] .......................... G03B 13/36; G03B 7/00
[52] U.S. Cl. ...................................... 354/400; 354/456
[58] Field of Search ............... 354/400, 402, 403, 408, 354/456

[56] References Cited
FOREIGN PATENT DOCUMENTS
  63-100429 5/1988 Japan .
  63-118133 5/1988 Japan .
  63-144330 6/1988 Japan .
  63-159817 7/1988 Japan .

Primary Examiner—W. B. Perkey
Attorney, Agent, or Firm—Oblon, Spivak, McClelland, Maier & Neustadt

[57] ABSTRACT

A camera comprising: a switch for starting a photo-taking sequence; a photo-taking lens system which is able to expand and contract to focus a subject to be photographed in accordance with a projecting operation of the lens; a distance measuring unit for measuring distance to the subject to be photographed; a lens drive unit for driving the lens system to move to expand or contract in accordance with the lens projecting operation; and a first calculation unit for calculating a movement amount of the lens system on the basis of the measurement result transmitted from the distance measuring unit. The camera is featured to comprise a comparator unit for comparing two distance measurement results obtained during one projecting operation of the lens system; a memory unit for memorizing data from the distance measuring unit and first calculation unit. The camera further comprises a second calculation unit for calculating a correction amount of the movement amount of the lens system on the basis of the comparison result transmitted from the comparator means.

5 Claims, 3 Drawing Sheets

CAMERA

BACKGROUND OF THE INVENTION

1. Field of the Invention

The present invention relates to a camera having an auto-focus mechanism.

2. Description of the Related Art

These days, in a field of lens shutter type small sized camera which is so called compact camera, a high magnification zoom lens system is prevailingly used so that a lens having a focus length of about f=105 mm in the telescopic side has become to be generally and widely used in the compact camera. In accordance with the camera having such a zoom lens, the depth of field tends to become shallow in comparison to the conventional camera having a photo-taking lens of f=35 mm.

Also, there is a tendency to shorten the minimum distance to the subject to be photographed as a result of which the number of steps to move the lens to project for short-distance focusing is increased. Such a projecting motion of the lens for focusing has to be accurately controlled to obtain a clear photograph of high quality.

In accordance with the camera (AF camera) of the related art, the lens is controlled and driven to project with the use of a pulse motor. However, since the number of steps for projecting the lens is many, it takes much time as much as 200 ms to 300 ms to project the lens.

As a result, in the case where a moving subject is to be photographed, at the time when the lens motion to project for focusing the subject is ended, there often occurs a case wherein the subject is further moved out of the depth of field so that the photograph becomes blurred.

Such a problem may not be significant or may not arise if the camera is constructed as a single lens reflex auto focus camera arranged in such a way that the lens projecting operation and the distance measurement operation are conducted simultaneously. However, in accordance with the compact camera which is constructed in such a way that the distance measurement unit is driven independently from the photo-taking lens system, the above mentioned problem is often occurs so that the subject is photographed in the state where the subject is moved out of the depth of field of the camera.

SUMMARY OF THE INVENTION

It is therefore an object of the present invention to provide a camera which is able to take a photograph avoiding a state of being out of focus for a moving subject.

The above mentioned object of the present invention can be achieved by a camera comprising:

a switch for starting a photo-taking sequence;

a photo-taking lens system which is able to expand and contract to focus a subject to be photographed in accordance with a projecting operation of the lens;

a distance measuring unit for measuring distance to the subject to be photographed;

a lens drive unit for driving the lens system to move to expand or contract in accordance with the lens projecting operation;

a first calculation unit for calculating a movement amount of the lens system on the basis of the measurement result transmitted from the distance measuring unit;

a comparator unit for comparing two distance measurement results obtained during one projecting operation of the lens system;

a memory unit for memorizing data from the distance measuring unit and first calculation unit; and a second calculation unit for calculating a correction amount of the movement amount of the lens system on the basis of the comparison result transmitted from the comparator means.

In accordance with the present invention, the camera is arranged in such a way that a first data and a second data are compared with each other wherein the first data is obtained from a result of a first distance measurement operation which is started by turning on a switch for starting a photo-taking sequence and the second data is obtained from a result of a second distance measurement operation which is conducted during the time when a photo-taking lens is being moved to focus the subject on the basis of the first data so that the amount of the focusing movement of the photo-taking lens is corrected on the basis of the result of the comparison.

Also, the camera in accordance with the present invention comprises: a switch for starting the photo-taking sequence; a distance measuring unit constituted from an optical system arranged beside the photo-taking lens system; a lens drive unit for moving the photo-taking lens by a movement amount corresponding to a first measurement data obtained from the distance measuring unit which is driven by turning on the switch; a control unit for operating the distance measuring unit during the time when the photo-taking lens is being moved; a comparator unit either for comparing the first data with a second distance measurement data which is obtained during the time when the photo-taking lens is being moved or comparing the amounts of the lens movement obtained on the basis of the first and second data, respectively; and a correction amount calculation unit for calculating and correcting the amount of the lens movement on the basis of the comparison result from the comparator unit and outputting a correction signal to the lens drive unit.

Also, in accordance with an embodiment of the present invention, the second distance measuring operation is started at the time at late $(T_O - T)$ before the time when the lens driving motion is ended, wherein the letter $T$ represents the time needed for the first distance measurement operation and the letter $T_O$ represents the time when the lens drive operation on the basis of the result from the distance measurement operation is ended.

Further, in accordance with another embodiment of the present invention, the exposure conditions are changed in the event wherein the difference between the data of the first and second distance measurement results is large.

In accordance with the arrangement of the camera of the present invention mentioned above, the second distance measurement operation is conducted simultaneously with the photo-taking lens driving operation on the basis of the first distance measurement result so that the lens focusing motion is corrected continuously as one sequence of lens drive motion on the basis of the first and second distance measurement results, which raises the comfortableness of using the camera and minimizes the waste of time and which makes it possible to accurately follow and focus the moving subject to be photographed.

Also, the starting point of the second distance measurement operation is started so that the second measurement is ended before the photo-taking lens drive motion is ended, which makes it possible to follow the subject immediately before the focusing motion is locked.

Besides, if the difference between the results of the first and second distance measurement operation is large so that it is discriminated as that the shutter speed is set slow for the subject which is moving at a high speed, the exposure condition is changed so that the shutter speed is shifted to the high speed side.

As mentioned above, in accordance with the present invention, the second distance measuring operation is conducted during the time when the photo-taking lens is being driven to focusing the subject so as to discriminate whether the subject is moving or not and if it is discriminated that the subject is moving, the amount of the lens drive motion is corrected on the basis of the first and second distance measurement data.

Therefore, it is an advantage of the present invention that it becomes possible to smoothly and accurately follow and focus the moving subject following the motion of the subject immediately before the focus is locked.

It is another advantage of the present invention that it becomes possible to shift the shutter speed to the high speed side when the motion of the subject is large and fast, which enables the photographer to obtain a clear photo of the moving subject of high quality without blurring the image.

Further objects and advantages of the present invention will be apparent from the following description of the preferred embodiments of the invention as illustrated in the accompanying drawings.

DESCRIPTION OF THE PREFERRED EMBODIMENTS

Embodiments of the present invention are described hereinafter with reference to the drawings.

Figure 1:
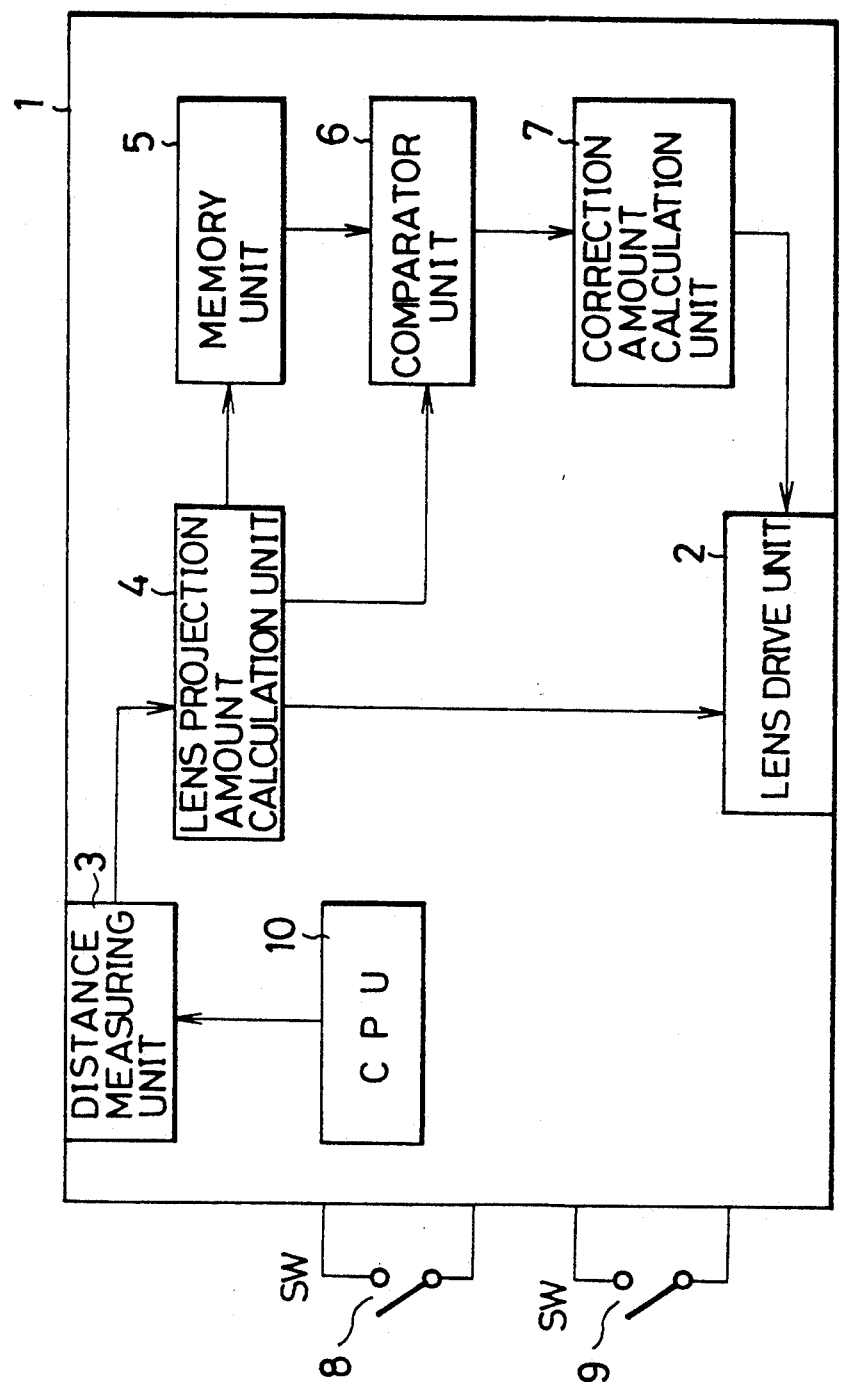
FIG. 1 is a constructional block diagram of the main portion of the camera in accordance with an embodiment of the present invention.

FIG. 1 illustrates a main portion of the camera in accordance with an embodiment of the present invention. The structure of the embodiment is constituted from: a camera body 1; a lens drive unit 2 for driving to move and focus the photo-taking lens (not shown); a distance measuring unit 3 which is arranged by an optical system apart from the photo-taking lens; a lens projection amount calculation unit 4 for calculating the lens drive amount to move and project for focusing the lens on the basis of the distance measurement data transmitted from the distance measuring unit 3; a memory unit 5 for memorizing the data output from the measuring unit 3 or the calculation unit 4; a comparator unit 6 which compares the data as described later; a correcting amount calculation unit 7 for calculating a correction amount for the lens drive amount on the basis of the comparison result output from the comparator unit 6; a first release switch 8 to start a photo-taking sequence; a second release switch 9 to start an exposure operation; and a CPU (Central Processing Unit) 10 for controlling the units mentioned above.

Figure 2:
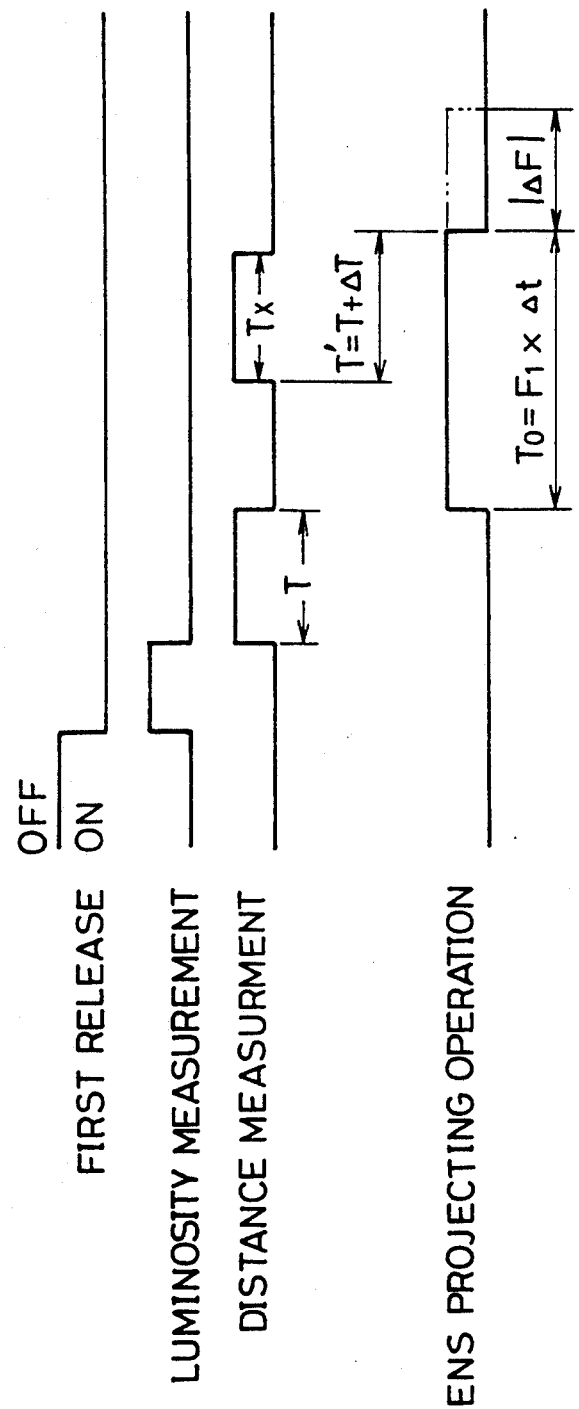
FIG. 2 is a timing chart of the photo-taking lens driving motion of the camera in accordance with the embodiment of FIG. 1.
Figure 3:
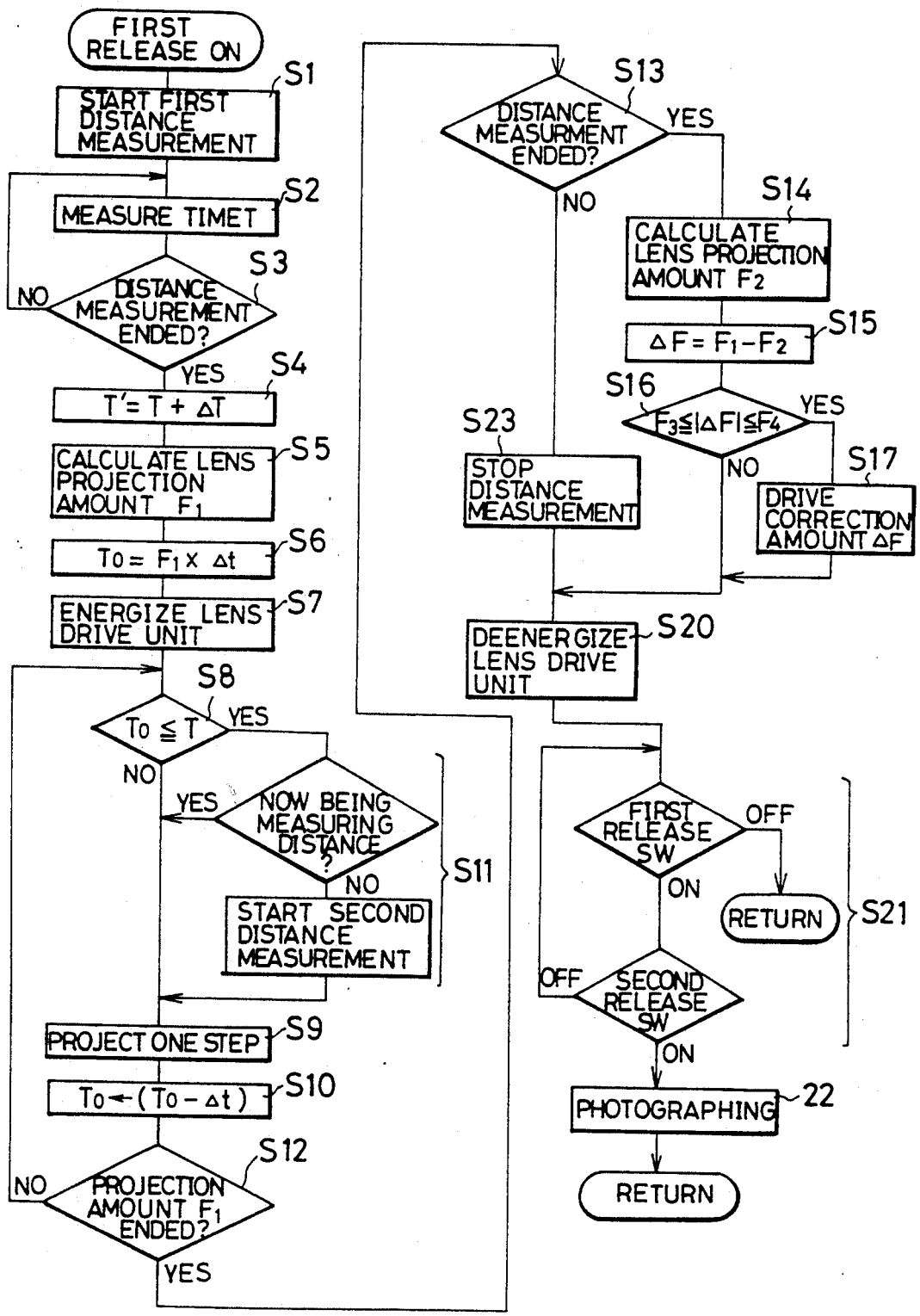
FIG. 3 is a flow chart of the photo-taking lens driving motion of the camera in accordance with the embodiment of FIG. 1.

Next, the drive motion of the photo-taking lens in accordance with the present invention is described with reference to the timing chart of FIG. 2 and the flow chart of FIG. 3.

When the first release switch 8 is turned on, the photo-taking sequence is started so that the CPU 10 transmits a first distance measurement start signal to the distance measuring unit 3 (step S1). Upon receipt of the start signal, the unit 3 starts the first distance measurement operation and the luminosity measurement operation is conducted and also the time T for measuring the distance is measured (step S2).

When the distance measurement operation is ended (YES in step S3), the flow moves to step S4 wherein the time T' for a second distance measurement operation is calculated by adding a margin time $\Delta T$ to the first measurement time T so that the time T' is calculated as $(T+\Delta T)$. The value of the time T' is memorized in the CPU 10.

After that, in step S5, a first data of amount $F_1$ for driving to move the lens is calculated in the calculation unit 4 on the basis of the data transmitted from the measuring unit 3. Assuming that it takes time $\Delta t$ for one step of movement of the lens, it requires the time $T_O = F_1 \times \Delta t$ for entire movement of the lens, as represented in step S6. The first distance measurement data mentioned above and the lens motion amount data $F_1$ are memorized in the memory unit 5.

After that, the lens drive unit 2 is energized by applying current thereto (step S7) and start to drive the lens to move and project.

The CPU 10 transmits the second distance measurement start signal to the unit 3 at late the above mentioned second distance measuring time T' before the time when the lens projecting motion is ended after the time $T_O$ required for the motion is elapsed from the start of the motion. That is, the second distance measurement operation is started at the time at late $(T_O - T)$ before the time when the lens projecting motion is ended.

More concretely, in step S8, it is discriminated whether $T_O$ is less than or equal to T or not. If the discrimination result is NO, that is, if $T_O > T$, the lens is moved to project by one step by one (step S9). Simultaneously with this step motion of the lens, the time $\Delta t$ needed for one step is subtracted from the time $T_O$ each time the lens is moved for one step so that the data $T_O$ is renewed to $T_O - \Delta t$ (step S10).

When $T_O$ becomes smaller or equal to T, that is, the discrimination result in step S8 becomes YES, the second distance measuring operation is started if the measurement is not started yet (step S11).

When the lens drive operation to move the lens to project by the amount $F_1$ is ended, that is, the discrimination result is YES in step S12 wherein whether the lens is moved by the amount $F_1$ or not is discriminated, the flow moves to step S13.

In step S13, whether the second distance measurement operation (time Tx) is ended or not is discriminated. If the discrimination result is YES, the flow moves to step S14 wherein the calculation unit 4 calculates the second data of amount $F_2$ for moving the lens to project on the basis of the second distance measurement data.

After that, in accordance with this embodiment of the present invention, in step S15, the comparator unit 6 compares the second data $F_2$ with the first data $F_1$ memorized in the unit 5 so as to obtain the data $\Delta F = F_1 - F_2$.

After that, in step S16, the reference values $F_3$ and $F_4$ ($F_3 < F_4$) are compared to the above mentioned comparison result $\Delta F$.

In the case where $F_3 \leq |\Delta F| \leq F_4$, that is, the discrimination result in step S16 is YES, it is judged as the subject is moving and the flow moves to step S17 wherein a lens movement amount correction signal corresponding to the value $\Delta F$ is transmitted to the lens drive unit 2. If the value $\Delta F$ is positive, the lens is returned to be retracted whereas if the value $\Delta F$ is negative, the lens is further expanded to project.

After a predetermined lens projecting operation to expand or contract the lens is ended, the current supply to the lens drive unit 2 is stopped in step S20 so that the camera becomes to be in a focus lock state. If the first and second release switches 8 and 9 are turned on in step S21, the photo-taking operation is carried out (step S22).

It is to be noted that, with respect to the timing of the second distance measurement, if the timing relation is as $T_O < T'$, the second distance measurement start signal is transmitted to the measuring unit 3 at the same time when the lens drive motion is started.

It is also to be noted that, if the comparison result $|\Delta F|$ is less than $F_3$, the data is regarded as a minor measuring error. Also, in the event where $F_1 = F_2$, it is judged as the subject is stationary. Further, if the comparison result $|\Delta F|$ is larger than $F_4$, it is judged as the auto focus point is being out of focus due to causes such as unintentional blurring movement of hands holding the camera so that the distance to a wrong subject is measured. In these cases, that is, in the case where the discrimination result is NO in step S16, focus is locked at the time when the lens is moved by the first data of amount $F_1$ (step S20).

Also, at the timing point when the lens projecting motion in response to the first data $F_1$ is ended, if the second distance measuring operation is not yet ended, that is, the discrimination result in step S13 is NO, the distance measurement operation is stopped (step S23) and the focus is locked (step S20).

In the above mentioned step S16, if $F_3 \leq |\Delta F| \leq F_4$, that is, the discrimination result in step S16 is YES, so that it is judged as the subject is moving, in the event wherein the shutter speed is judged as being set to be slow, the exposure conditions are changed so that the shutter speed is shifted to the high speed side. By controlling the shutter speed in such a way, it becomes possible to avoid blurring of the image of the photograph.

It is to be noted that, in accordance with the above mentioned embodiment of the present invention, the comparator unit 6 compares the two calculated data $F_1$ and $F_2$ obtained from the first and second distance measurement data, respectively. However, it is possible to arrange so that the distance measurement data themselves are compared to each other instead of comparing the calculated data, since the data before and after the calculation are substantially the same from the point of comparison object.

Many widely different embodiments of the present invention may be constructed without departing from the spirit and scope of the present invention. It should be understood that the present invention is not limited to the specific embodiments described in the specification, except as defined in the appended claims.

What is claimed is:

1. A camera comprising:
   a switch for starting a photo-taking sequence;
   a photo-taking lens system which is able to expand and contract to focus a subject to be photographed in accordance with a projecting operation of the lens;
   a distance measuring means for measuring distance to said subject to be photographed;
   a lens drive means for driving said lens system to move to expand or contract in accordance with said projecting operation;
   a first calculation means for calculating a movement amount of said lens system on the basis of the measurement result transmitted from said distance measuring unit;
   a comparator means for comparing two distance measurement results obtained during one projecting operation of said lens system;
   a memory means for memorizing data from said distance measuring means and first calculation means; and
   a second calculation means for calculating a correction amount of said movement amount of said lens system on the basis of the comparison result transmitted from said comparator means.

2. A camera according to claim 1, wherein the camera further comprises a control means for controlling said photo-taking sequence in such a way that said lens drive means starts to drive said lens system on the basis of a first data obtained from a first distance measurement operation conducted by said distance measuring means, that a second distance measurement operation is conducted during the lens projecting operation conducted on the basis of said first data and that a second data obtained from the second distance measurement operation is compared with said first data by said comparator means so as to calculate the correction amount of the movement of the lens system by said second calculation means so that the lens drive means drives the lens system on the basis of said correction amount.

3. A camera according to claim 2, wherein said second distance measurement operation is started so that the second measurement operation is finished before the lens projecting operation on the basis of the first distance measurement operation is ended.

4. A camera according to claims 1, 2 or 3, wherein in the case where the difference between said first and second data is larger than a predetermined value, an exposure condition is changed.

5. A camera according to claim 4, wherein the shutter speed is shifted to a high speed side when the difference between the first and second data is larger than the predetermined value.

* * * * *